United States Patent

[11] 3,610,895

[72] Inventor Donald L. Wollesen
San Jose, Calif.
[21] Appl. No. 818,965
[22] Filed Apr. 24, 1969
[45] Patented Oct. 5, 1971
[73] Assignee ARE Incorporated
San Jose, Calif.

[54] TIMER
7 Claims, 2 Drawing Figs.
[52] U.S. Cl. .................................................. 235/92 AE,
235/92 R, 235/92 T, 235/92 TC
[51] Int. Cl. ........................................................ H03k 21/30
[50] Field of Search ............................................ 235/92;
58/74

[56] References Cited
UNITED STATES PATENTS
3,508,034 4/1970 Toyama ......................... 235/92

*Primary Examiner*—Thomas A. Robinson
*Assistant Examiner*—Robert F. Gnuse
*Attorneys*—Jack M. Wiseman and Thomas E. Schatzel ABSTRACT: Timing of a vehicle between two points from a standstill or between two points while moving is accomplished by using a first bistable device to provide pulses to a counter and a second bistable device to prevent application of pulses to the counter. The first bistable device is actuated by a radiation-responsive device or a vehicle movement responsive device whereas the second bistable device is only actuated by the radiation-responsive device. The bistable devices are interconnected to prevent both from being actuated simultaneously and means are provided to prevent the second bistable device from being inadvertently actuated by extraneous sources of radiation.

PATENTED OCT 5 1971 3,610,895

PHOTOCELL   PHOTOCELLS

LIGHT                                   LIGHTS

INVENTOR.
DONALD L. WOLLESEN
BY Jack M. Wiseman
Thomas E. Schatzel
ATTORNEYS

TIMER

BACKGROUND OF THE INVENTION

This invention relates to timing apparatus for vehicles and more particularly to vehicle timing apparatus for indicating elapsed time between two points and also includes elapsed time beginning from a standing start.

One of the problems a racer has at drag strips and other racing events is getting a "time slip" showing the time his vehicle needed to traverse a certain distance. The time may or may not be from a standing start. Since a racing engine may cost about $5,000 for which the driver may get 100 runs for an engine cost of $50 for each run, such a time slip or time record is important to racing car owners and drivers. Since most tracks and drag strips use light beams interrupted by the vehicles to determine vehicle time for certain events, it would be helpful for any timing device mounted within the vehicle itself to be responsive to such light beams. Also, such a timer should not be inadvertently affected by extraneous light sources.

BRIEF DESCRIPTION OF INVENTION

Briefly described, the present invention relates to such a vehicle timer for use in a vehicle that interrupts one or more radiation paths to determine vehicle acceleration and/or vehicle speed and includes a source of clock pulses and a counter which is adapted to be actuated by the clock pulses. The counter also includes visual display means for indicating the count contained therein. Gating means coupled between the pulse source and the counter permit, when enabled, the clock pulses to be applied to the counter. A transducer is coupled to a first bistable device to toggle the bistable device when the vehicle moves from a stationary position. A radiation-responsive device mounted on the vehicle is coupled to a second bistable device to toggle the bistable device whenever the vehicle interrupts a radiation path. Circuit means coupling the bistable devices to the gating means, and responsive to the condition of the bistable devices, cause the gating means to be enabled when the vehicle moves from a stationary position and cause the gating means to be disabled when the vehicle interrupts a predetermined radiation path thereby causing the counter to display the vehicle elapsed time from a standing start to a predetermined location.

In accordance with another feature of this invention, switching means coupled between the first bistable device and the transducer and radiation-responsive device, enables the radiation-responsive device to be coupled to both bistable devices so that the gating means is enabled and disabled by the vehicle interrupting radiation paths thereby causing the vehicle elapsed time between two points to be displayed by the counter which enables the vehicle speed between the two points to be readily calculated.

DESCRIPTION OF THE DRAWINGS

These and other features, aspects and advantages of the present invention will become apparent from consideration of the following detailed description taken in conjunction with the annexed drawings in which.

DESCRIPTION OF THE PREFERRED EMBODIMENT

Figure 1:
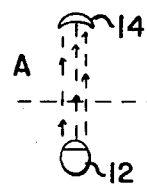
FIG. 1 is a schematic illustration of a typical drag strip.
Figure 1:
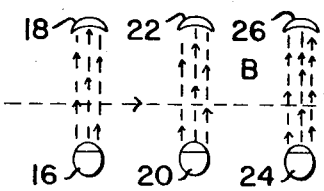

Referring now to FIG. 1, there is schematically illustrated a typical elapsed time and speed determining system for a drag strip. The path of the vehicle is shown by the dotted line 10. Generally, the vehicle will start from a standstill at point A and accelerate as quickly as possible. Elapsed time is measured from point A to point B. A light beam at point A is provided by illuminating means 12 which is directed toward an associated photocell 14 and a light beam at point B is provided by illuminating means 20 and an associated photocell 22. Both of these light beams are perpendicular to the vehicle path of travel 10. As will be apparent to those skilled in the art, by a vehicle interrupting the light beams, either making the beam or breaking it, the photocells provide means for determining the vehicle elapsed time between points A and B. The distance between points A and B can very accurately be determined by any well-known means.

In a similar manner, a typical drag strip also includes speed traps for determining the speed of a vehicle after it has been brought up to speed. Such a speed trap is shown in FIG. 1 by a "start" light beam provided by illuminating means 16 and associated photocell 18 and a "stop" light beam provided by illuminating means 24 and associated photocell 26. Interruption of these light beams by a vehicle passing therethrough enables the speed of the vehicle therebetween to be readily determined if the distance between these light paths is known.

As will now be apparent, any timing means within a vehicle traveling the path 10 which makes use of the illuminating means, or lights 12, 16, 20 and/or 24 must be able to distinguish between the function of such lights. For example, for an elapsed time, or acceleration run, the elapsed time is determined by reaching point B, light 20, and not the light 16 which is located between the beginning and end points of an acceleration test. Likewise, during a speed test between lights 16 and 24 the speed-determining means must ignore light 20 which is located between lights 16 and 24. As will be clearly understood by those skilled in the art, no such problems are encountered by timing apparatus outside of the vehicle along the drag strip and activated by the photocells 14, 18, 22 and 26.

Figure 2:
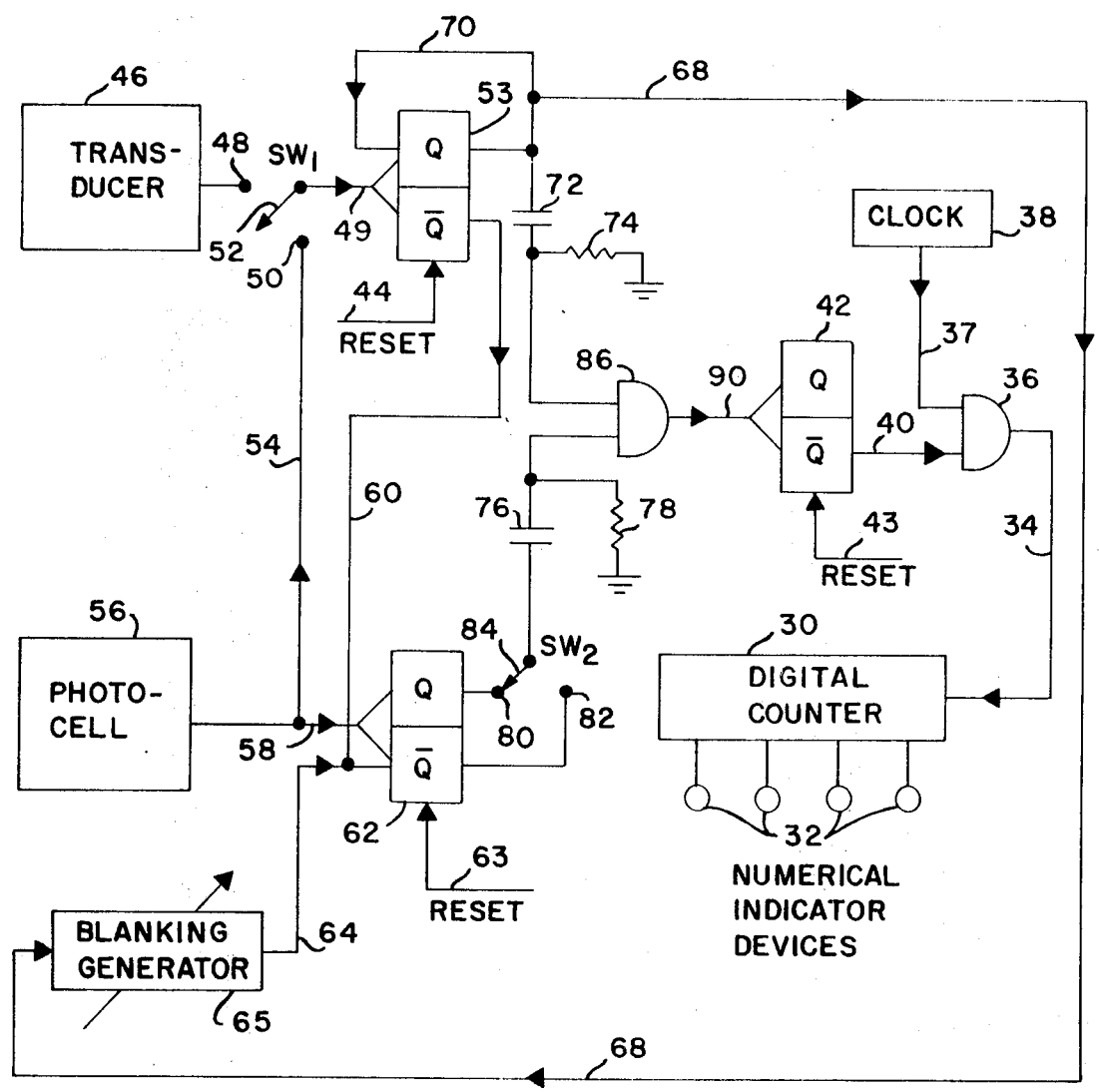
FIG. 2 is a schematic illustration of vehicle timing apparatus in accordance with the present invention and which may be mounted on or within a vehicle to provide the driver with a record of his vehicle performance.

Timing apparatus in accordance with this invention and wholly carried by or within, the vehicle is schematically shown by FIG. 2 as including display means having a number of numeric indicator devices 32, such as Neon Readout tubes, which are activated by suitable means, such as a digital counter 30. A source of clock pulses 38, such as a crystal-controlled oscillator or multivibrator, is coupled to the counter 30 by way of its output lead 37, an AND gate circuit 36 and the input lead 34 to the counter 30. In addition to the output pulses of the clock 38, the AND gate 36 has an input on lead 40 which is coupled to the reset output of a bistable device, such as a flip-flop circuit 42. The operation of the AND gate circuit 36 is such that when the flip-flop circuit 42 is reset the potential on lead 40 does not enable the AND gate circuit 36 and the output of the clock 38 is not applied to the counter 30. When the flip-flop circuit 42 is set, however, the AND gate circuit 42 is enabled, thereby enabling the pulses provided by the clock 38 to step (count up) the counter 30. The flip-flop circuit 42 can be reset by the proper potential being applied to the reset lead 43. In accordance with this invention, the counter can display time in seconds and fractions of seconds. It is clear then that by setting the counter 30 to zero, the elapsed time between points A and B for a vehicle can be determined by enabling the AND gate circuit 36 as the vehicle leaves point A, and disabling the AND gate circuit 36 when the vehicle reaches point B. Alternatively, the speed of a vehicle traveling between the lights 16 and 24 can readily be determined by setting the counter 30 to zero, enabling the AND gate circuit 36 when the vehicle is at the light 16 and disabling the AND gate circuit 36 when the vehicle reaches the light 24.

Proper enabling and disabling of the AND gate circuit 36 is accomplished by the remaining circuitry of FIG. 2 which includes a transducer 46 which may include a mercury switch, a pendulum switch, an accelerometer, or the like. The function of the transducer 46 is to provide an electrical signal when the vehicle moves from a stationary position, for example, when the vehicle accelerates from point A from a standing start. The output of the transducer 46 is coupled to a switch $SW_1$, having a contact arm 52 and contacts 50 and 48. When the arm 52 is in contact with the switch element 48, the output of the transducer 46 is applied to a binary device, such as a JK flip-flop circuit 53 by way of a lead 49. When the arm 52 contacts the switch element 50, a light responsive device, such as a photocell 56; is coupled to a binary device, such as a JK flip-flop circuit 62 by way of the lead 58 and also to the flip-flop circuit 53 by way of the leads 54 and 49. The flip-flop circuit 62 is also coupled to an adjustable blanking generator 65 by way of a lead 64. The photocell 56 is mounted on the exterior of the vehicle and at a location where it can interrupt the light beams provided by the illuminating means, or lights, 12, 16, 29 and 24 of FIG. 1.

In accordance with well known means, the flip-flop circuit 53 can be toggled by voltage pulses on the lead 49 from the transducer 46 or the photocell 56. However, due to the feedback lead 70, once the flip-flop circuit 53 is set, it will remain set until reset by the proper potential on reset lead 44 coupled thereto, regardless of the potential, or voltage pulses, appearing on the lead 49. As shown in FIG. 1, the manually adjustable blanking generator 65 (described below) has its output appearing on the lead 64 coupled to the set inhibit input of the flip-flop circuit 62 and the set inhibit input of the flip-flop circuit 62 is also coupled to the output of the flip-flop circuit 53 by way of the lead 60. In accordance with well-known means, voltage impulses from the photocell on the lead 58 will toggle the flip-flop circuit 62. However, if the potential applied to the set inhibit input of the flip-flop circuit 62, by way of the lead 64 or 60, is up (positive), the flip-flop circuit 62 will remain reset regardless of the voltage impulses on the lead 58. The flip-flop circuit 62 is reset by the appropriate potential on the reset lead 63.

The set output of the flip-flop circuit 53 is coupled to a differentiating network, comprising a capacitor 72 and resistor 74 such that switching of the flip-flop circuit 53 from its reset condition to its set condition causes the positive going voltage step function thus generated to be transformed into a positive voltage spike by the differentiating network in a well-known manner. This positive voltage spike is applied as an input of an OR gate circuit 86 which passes it by way of a lead 90 to toggle the flip-flop circuit 42. If a negative voltage spike is required to toggle the flip-flop circuit 42, the OR gate circuit 86 can readily be designed to invert the positive voltage spike applied thereto. When the flip-flop circuit 53 is switched from its set to its reset condition, the negative going voltage step function applied to the differentiating network (resistor 74 and capacitor 72) results in a negative voltage spike. This voltage spike does not pass through the OR gate circuit 86 and has no effect on the flip-flop circuit 42.

The set output of the flip-flop circuit 62 is coupled to a terminal 80 of a switch $SW_2$ and the reset output of the flip-flop circuit 62 is coupled to a terminal 82 of the switch $SW_2$ which has an arm 84, that is coupled to one input of the OR gate circuit 86 by way of another differentiating network which comprises a capacitor 76 and a resistor 78. In a manner as described above in conjunction with the flip-flop circuit 53, when the switch $SW_2$ arm 84 contacts the terminal 80 setting of the flip-flop circuit 62 toggles the flip-flop circuit 42, but resetting of the flip-flop circuit 62 has no effect on the condition of the flip-flop circuit 42. However, when the arm 84 contacts the terminal 82, resetting of the flip-flop circuit 62 toggles the flip-flop circuit 42 and setting of the flip-flop circuit 62 has no effect on the condition of the flip-flop circuit 42. Accordingly, when the flip-flop circuit 62 is reset and the switch arm 84 in contact with the terminal 80, the next light path interrupted by the photocell 56 can toggle the flip-flop circuit 62 to its set condition and therefore also can toggle the flip-flop circuit 42. However, when the flip-flop circuit 62 is reset and the arm 84 of the switch $SW_2$ is in contact with the terminal 82, the next light path interrupted can cause the output of the photocell 56 to toggle the flip-flop circuit 62 to its set condition which has no effect on the flip-flop circuit 42. The next light path interrupted can cause the output of the photocell to toggle the flip-flop circuit 62 to its reset condition and therefore can also toggle the flip-flop circuit 42.

The blanking generator 65 has its input coupled to the set output of the flip-flop circuit 53 by way of a lead 68 and its output coupled to the inhibit input of the flip-flop circuit 62 by way of the lead 64. The function of the blanking generator 65 is to provide an electrical pulse at the inhibit input of the flip-flop circuit 62 whenever the flip-flop circuit 53 is set. The duration of this pulse is manually adjustable by a dial (not shown) which is generally calibrated in seconds and parts thereof. As will be apparent to those skilled in the art, many circuits can provide such an adjustable pulse. In one embodiment of this invention which was constructed, the blanking generator comprised a differential amplifier. As is well known to those skilled in the art, this type of circuit produces an output pulse the length of which is determined by an RC time constant which is readily adjustable by using a manually adjustable resistance in the RC time constant. The output pulse on the lead 64 from the blanking generator 65 will prevent the flip-flop circuit 62 from being set as long the pulse occurs. As described below, this can be utilized to prevent other light sources from setting the flip-flop circuit 62 and prematurely disabling the AND gate circuit 36.

The operation of the apparatus will best be understood by way of specific example. Assume that a vehicle having the apparatus of FIG. 2 mounted thereon is stationary at point A and acceleration run to point B is to be made. Assume also that the digital counter 30 is set to zero and the flip-flop circuits 42, 53 and 62 have been reset. The counter 30 is typically provided with a switch to set it to zero and a single switch (not shown) coupled to the proper polarity and also to each of the reset leads 43, 44 and 63 associated with the flip-flop circuits 42, 53 and 62, respectively, can be used to reset the flip-flop circuits 42, 53 and 62 in a well known manner. Further, it will be assumed that the arm 52 of the switch $SW_1$ contacts the terminal 48, the arm 84 of switch $SW_2$ contacts the terminal 82 and that the generator 65 is set so as not to produce an output when the flip-flop circuit 53 is set. As the vehicle accelerates from point A, the transducer 46 produces an output that sets the flip-flop circuit 53 which results in the flip-flop circuit 42 being set. Previously when the flip-flop circuit 42 was reset, the pulses produced by the clock 38 could not pass through the disabled AND gate circuit 36. However, now that the AND gate circuit 36 is enabled by the flip-flop circuit 42 being set, the clock pulses are coupled to the counter 30 which displays the elapsed time, since movement of the vehicle began in seconds and parts thereof due to these pulses being applied thereto. It is clear then that the frequency of the pulses supplied by the clock 38 are related to seconds in time and parts thereof, i.e., tenths of seconds, hundredths of seconds, et cetera. Now that the flip-flop circuit 53 is set, the feedback along lead 70 from the set output to the reset inhibit input will prevent the flip-flop circuit 53 from being toggled by any changes in acceleration or decceleration which may cause the transducer 46 to provide an electrical impulse on lead 49. When the vehicle interrupts the light path between the light source 16 and the photocell 18, the photocell 56 produces a voltage impulse on the lead 58 which toggles the flip-flop circuit 62 into its set condition. However, since the arm 84 of switch $SW_2$ is in contact with the terminal 82, this has no effect on the flip-flop circuit 42 as described above. When the vehicle interrupts the light path at point B between the light source 20 and the photocell 22, the voltage impulse provided on the lead 58 by the photocell 56 toggles the flip-flop circuit 62 into its reset condition which, for the position of the switch $SW_2$, causes the flip-flop circuit 42 to be reset. This action disables the AND gate circuit 36 and no further clock pulses are applied to the counter 30. At this point, the counter 30 displays a visual indication of the elapsed time required by the vehicle to reach point B from point A from a standing start. If, for the above example, the light source 16 were not turned on or not present, the arm 84 of the switch $SW_2$ would be placed in contact with the terminal 82, which, as described above, would enable the first light path interrupted by the vehicle after leaving point A to disable the timer of FIG. 2.

Assume now that the speed of the vehicle between two points is to be determined. This can be for the distance between light sources 16 and 24 for example. With the flip-flop circuits 42, 53 and 62 and counter 30 reset as described above, the arm 52 of the switch SW₁ is placed in contact with the terminal 50, since the time period is not to begin as the vehicle moves from a stationary position. Also, since the light path between the source 20 and photocell 22 will be interrupted before the desired distance is traversed, the arm 84 of switch SW₂ is placed in contact with the terminal 82. As the moving vehicle interrupts the light path between the source 16 and the photocell 18, the photocell 56 produces a voltage impulse on leads 54 and 58. Since the reset output of the flip-flop circuit 53 is coupled to the inhibit input of the flip-flop circuit 62 by way of the lead 60, this impulse will toggle the flip-flop circuit 53 into its set condition but will not have any effect on the flip-flop circuit 62 which remains reset. Setting of flip-flop circuit 53 enables pulses from the clock 38 to begin counting up the counter 30 as described above. Interruption of the light path between the source 20 and photocell 22 will toggle the flip-flop circuit 62 into its set condition which does not effect flip-flop circuit 42 or the AND gate circuit 36. However, interruption of the light path between the source 20 and the photocell 22 has no effect on the flip-flop circuit 53 which remains set due to its set output being coupled to its reset inhibit input. When the vehicle interrupts the light path between the source 24 and the photocell 26, the flip-flop circuit 53 remains unaffected (remains set) and the flip-flop circuit 62 is reset to disable the AND gate circuit 36 by resetting the flip-flop circuit 42. The counter 30 now displays the time required by the vehicle to reach the source 24 from the source 16. Since the distance between these points is known, the average speed of the vehicle therebetween can readily be calculated.

If a speed or acceleration run is to take place between two points, such as between the source 12 and 16; then the arm 84 of the switch SW₂ is placed in contact with terminal 80 and the appropriate setting of switch SW₁ is made i.e., arm 52 on contact 48 for acceleration from a standing start and on terminal 50 for speed not from a standing start. Setting of flip-flop circuit 53 enables the clock 38 pulses to begin counting up the counter 30 as the vehicle passes or leaves the source 12. When the vehicle interrupts the light path between the source 16 and the photocell 18, the photocell 56 provides a potential on lead 58 that toggles the flip-flop circuit 62 into its set condition. The resulting positive going voltage step function on the terminal 80 to which the arm 84 of switch SW₂ is connected causes the flip-flop circuit 42 to be reset which disables the AND gate circuit 36. The counter 30 now displays the time the vehicle needed to travel between light sources 12 and 16. If the driver knows that his run will be approximately a certain time interval, say ten seconds, then he can select a slightly less time interval, say nine seconds, on the manually adjusted control of the blanking generator 65. When the time interval of the run begins by the flip-flop circuit 53 being set, the output from the flip-flop circuit 53 on the lead 68 initiates the output from the generator 65 that prevents the flip-flop circuit 62 from being set during the selected time interval, nine seconds by way of example. During this selected time interval, any extraneous light sources which would cause the photocell 56 to produce voltage impulses on the lead 58 are prevented from setting the flip-flop circuit 62. In this manner, unwanted light sources are prevented from prematurely stopping the timer. Because the feedback along lead 70 will keep the flip-flop circuit 53 set once it has been toggled into its set condition, no such blanking pulse need be applied thereto.

As will now be apparent, the timer shown in FIG. 2 and described hereinabove can provide, for drag racing, the elapsed time from a standing start to another position. For circuit track racing, the timer provides the time for a vehicle to travel a certain distance such as lap time, time through a corner, time down a straight, or the like. Further, the timer contains means to prevent extraneous light sources from adversely affecting its performance. In this regard, it should be noted that the sources 12, 16, 20 and 24 need not be visible light sources but can provide any type of radiation to which devices 14, 18, 22, 26 and 56 can be responsive to provide corresponding electrical impulses. Also, the logic circuitry of FIG. 2 can be fabricated, as is well known by those skilled in the art, economically and packaged so as to require very little space. For example, the electronic logic can be packaged and attached to the counter 30. It only being necessary to locate the radiation responsive device 56 outside such a package.

I claim:

1. For use in a vehicle that interrupts one or more radiation paths to determine the acceleration and/or speed of the vehicle, timing apparatus comprising:
a source of clock pulses,
a counter operatively responsive to said clock pulses and including visual display means that indicate the count contained within said counter,
gating means connected between said source of pulses and said counter and, when enabled, apply said clock pulses to said counter,
a first bistable device,
a transducer on said vehicle coupled to said first bistable device to toggle said first bistable device when said vehicle moves from a stationary position,
a second bistable device,
a radiation-responsive device mounted on said vehicle to toggle said second bistable device in response to said vehicle interrupting a radiation path,
circuit means coupling said first and second bistable devices to said gating means and responsive to the state of said bistable devices to enable said gating means when said vehicle moves from a stationary position and to disable said gating means when said vehicle interrupts a predetermined radiation path, and
switching means connected between said first bistable device, and said transducer and said radiation responsive device and adapted to couple either said transducer or said radiation responsive device to said first bistable device.

2. The apparatus of claim 1 further including;
coupling means between said first and second bistable devices to prevent said second bistable device from being toggled until after said first bistable device has been toggled.

3. The apparatus of claim 2 wherein coupling of said radiation-responsive device also to said first bistable device enables said gating means when said vehicle interrupts a first radiation path and disables said gating means when said vehicle interrupts a predetermined subsequent radiation path.

4. For use in a vehicle that interrupts one or more radiation paths to determine the acceleration and/or speed of the vehicle timing apparatus comprising:
a source of clock pulses,
a counter operatively responsive to said clock pulses and including visual display means that indicate the count contained within said counter,
gating means connected between said source of pulses and said counter and, when enabled, apply said clock pulses to said counter,
a first bistable device,
a transducer on said vehicle coupled to said first bistable device to toggle said first bistable device when said vehicle moves from a stationary position,
a second bistable device, a radiation-responsive device mounted on said vehicle to toggle said second bistable device in response to said vehicle interrupting a radiation path,
circuit means coupling said first and second bistable devices to said gating means and responsive to the state of said bistable devices to enable said gating means when said vehicle moves from a stationary position and to disable said gating means when said vehicle interrupts a predetermined radiation path, and
said second bistable device has two stable states with each state having an output terminal associated therewith, switching means in said circuit means connected to said output terminals for coupling either of said output terminals, respectively, to said circuit means and to enable at least one radiation path to be interrupted without disabling said gating means.

5. For use in a vehicle that interrupts one or more radiation paths to determine the acceleration and/or speed of the vehicle, timing apparatus comprising:
- a source of clock pulses,
- a counter operatively responsive to said clock pulses and including visual display means that indicate the count contained within said counter,
- gating means connected between said source of pulses and said counter and, when enabled, applies said pulses to said counter,
- a first bistable device,
- a transducer on said vehicle coupled to said first bistable device to toggle said first bistable device when said vehicle moves from a stationary position,
- a second bistable device,
- a radiation-responsive device mounted on said vehicle to toggle said second bistable device in response to said vehicle interrupting a radiation path, and
- circuit means coupling said first and second bistable devices to said gating means and responsive to the state of said bistable devices to enable said gating means when said vehicle moves from a stationary position and to disable said gating means when said vehicle interrupts a predetermined radiation path, said circuit means includes a third bistable device adapted to be toggled either by said first or said second bistable device being toggled into a predetermined stable, and said third bistable device having an output associated with one of its stable states coupled to said gating means and adapted to enable and disable said gating means as said third bistable device is toggled.

6. For use in a vehicle that interrupts one or more radiation paths to determine the acceleration and/or speed of the vehicle timing apparatus comprising:
- a source of clock pulses,
- a counter operatively responsive to said clock pulses and including visual display means that indicate the count contained within said counter,
- gating means connected between said source of pulses and said counter and, when enabled, apply said clock pulses to said counter,
- a first bistable device,
- a transducer on said vehicle coupled to said first bistable device to toggle said first bistable device when said vehicle moves from a stationary position,
- a second bistable device,
- a radiation-responsive device mounted on said vehicle to toggle said second bistable device in response to said vehicle interrupting a radiation path, and
- circuit means coupling said first and second bistable devices to said gating means and responsive to the state of said bistable devices to enable said gating means when said vehicle moves from a stationary position and to disable said gating means when said vehicle interrupts a predetermined radiation path,
- said first bistable device includes feedback means that prevents said first bistable device from being toggled after it has been toggled into a predetermined one of its stable states.

7. For use in a vehicle that interrupts one or more radiation paths to determine the acceleration and/or speed of the vehicle timing apparatus comprising:
- a source of clock pulses,
- a counter operatively responsive to said clock pulses and including visual display means that indicate the count contained within said counter,
- gating means connected between said source of pulses and said counter and, when enabled, apply said clock pulses to said counter,
- a first bistable device,
- a transducer on said vehicle coupled to said first bistable device to toggle said first bistable device when said vehicle moves from a stationary position,
- a second bistable device,
- a radiation-responsive device mounted on said vehicle to toggle said second bistable device in response to said vehicle interrupting a radiation path,
- circuit means coupling said first and second bistable devices to said gating means and responsive to the state of said bistable devices to enable said gating means when said vehicle moves from a stationary position and to disable said gating means when said vehicle interrupts a predetermined radiation path, and
- manually adjustable means coupled to said second bistable device and adapted to prevent said second bistable device from being toggled for a predetermined time interval,
- said adjustable means includes circuit means for generating an electrical pulse of predetermined duration which when applied to said second bistable device prevents said second bistable device from being toggled.